(No Model.) 4 Sheets—Sheet 1.

J. BULLOUGH.
ELECTRIC TESTING DEVICE FOR CARDING MACHINES.

No. 390,113. Patented Sept. 25, 1888.

Witnesses. Inventor.

John Bullough (No Model.)   J. BULLOUGH.   4 Sheets—Sheet 2.
ELECTRIC TESTING DEVICE FOR CARDING MACHINES.
No. 390,113.   Patented Sept. 25, 1888.

Witnesses.   Inventor.

(No Model.)
J. BULLOUGH.
ELECTRIC TESTING DEVICE FOR CARDING MACHINES.
No. 390,113. Patented Sept. 25, 1888.
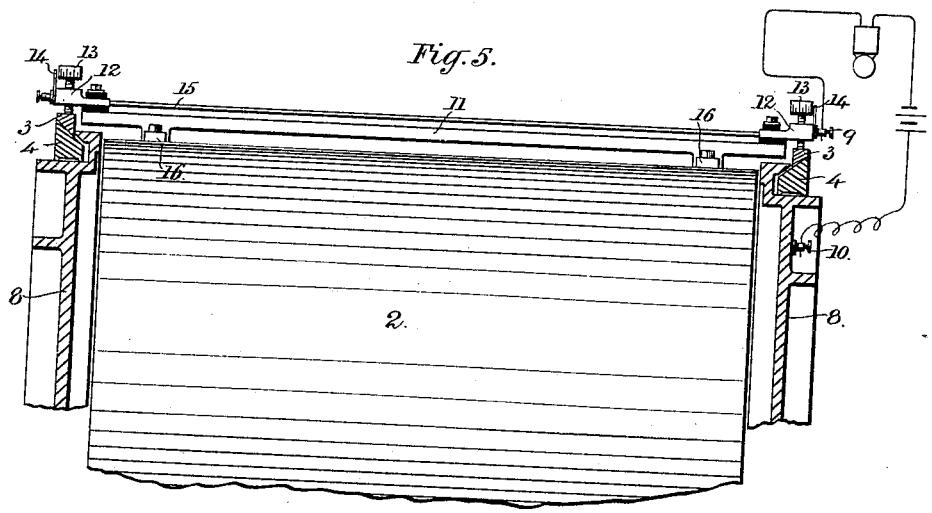
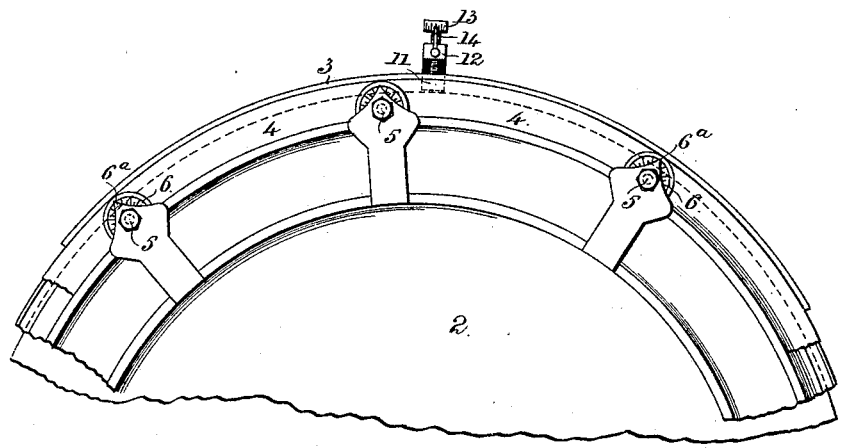
Witnesses.
Inventor.

United States Patent Office.

JOHN BULLOUGH, OF ACCRINGTON, COUNTY OF LANCASTER, ENGLAND.

ELECTRIC TESTING DEVICE FOR CARDING-MACHINES.

SPECIFICATION forming part of Letters Patent No. 390,113, dated September 25, 1888.

Application filed May 16, 1888. Serial No. 274,024. (No model.) Patented in England February 9, 1886, No. 1,849.

*To all whom it may concern:*

Be it known that I, JOHN BULLOUGH, a subject of Her Majesty the Queen of Great Britain, residing at Accrington, in the county of Lancaster, England, have invented new and useful Improvements in Carding-Machines, (for which I have obtained a patent in Great Britain, No. 1,849, dated February 9, 1886,) of which the following is a specification.

My invention relates to improvements in carding-machines, or to means for ascertaining when the card-flats are accurately adjusted on the surfaces or rings on which they travel, so that their teeth shall be in correct relative working position with the teeth on the card-cylinder.

It consists in electrically connecting the card-flats and card-cylinders and suitably insulating the framing of the machine, so that the circuit may be completed only by the contact of the teeth on the card-flats with the teeth on the cylinder, and, further, in employing in place of the card-flats, with a machine having either an insulated or uninsulated frame, trial or "test" flats for the same purpose—viz., for determining the accuracy of adjustment of the surfaces or rings on which the card-flats proper travel.

To clearly explain the nature of my invention, reference is made to the accompanying drawings, in which it is illustrated in connection with an arrangement for regulating the card-flats, consisting of an adjustable cone and flexible ring, which was patented to me in the United States under date of October 25, 1887, No. 372,038, as assignee of one Frederick Mills, the inventor.

Figure 1:
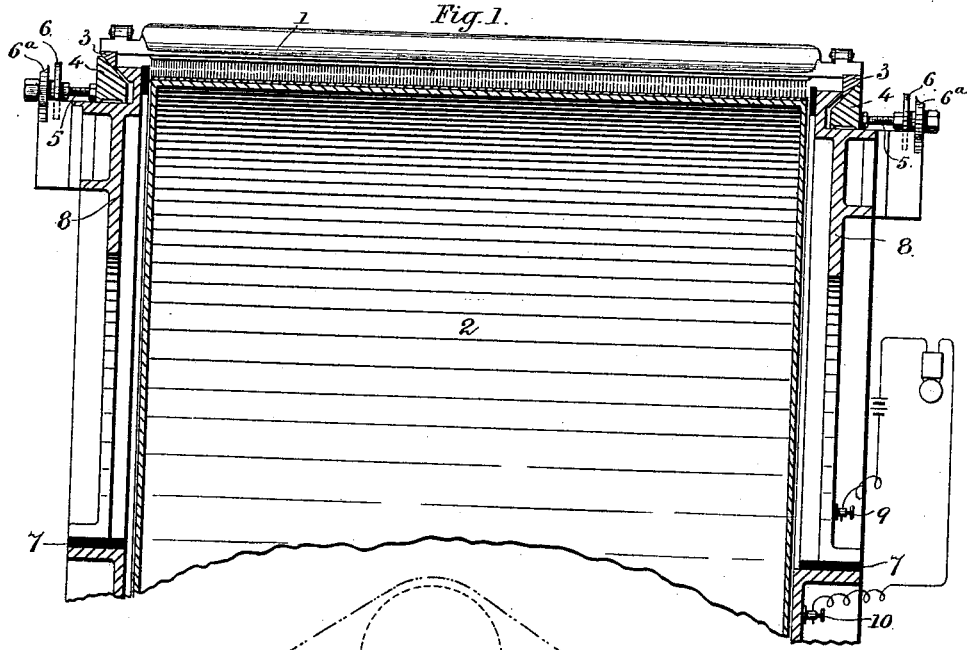
Figure 2:
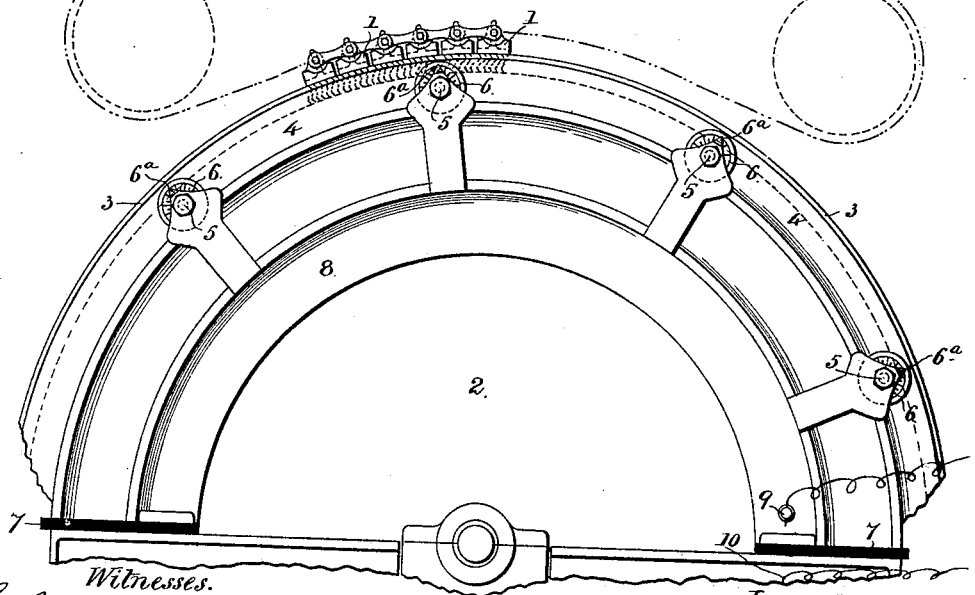
Figure 3:
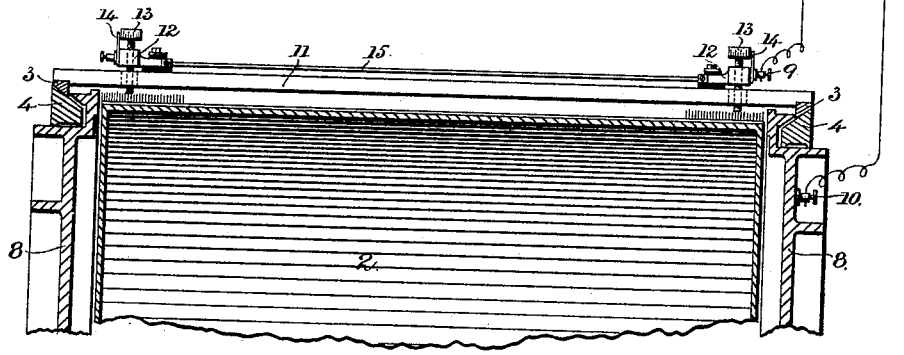
Figure 4:
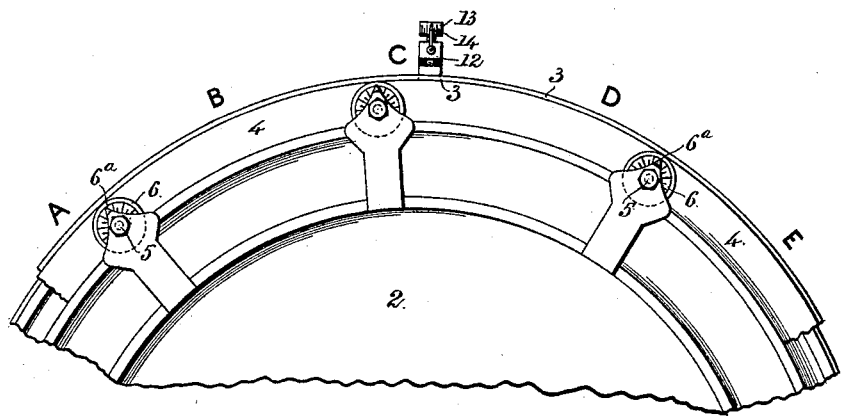
Figure 7:
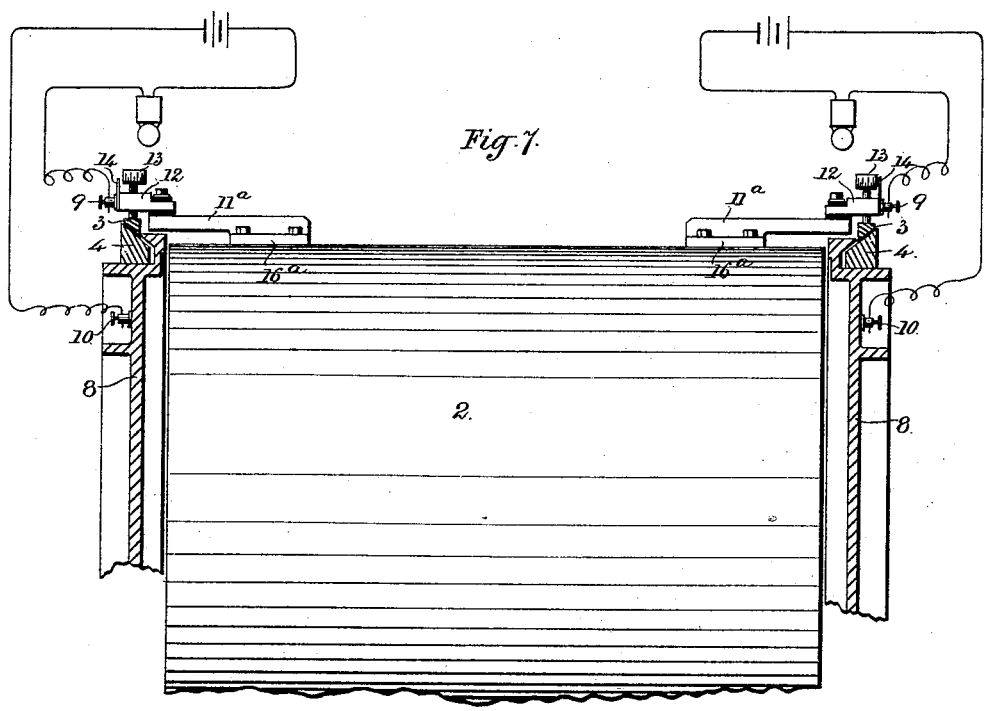

In said drawings, Figure 1 is a sectional elevation of a portion of a carding-cylinder and a card-flat, the end portions or "bends" being insulated from the rest of the frame. Fig. 2 is an end elevation of Fig. 1. Fig. 3 is a section of a portion of a card-cylinder where the bends are not insulated, showing one form of test-flat. Fig. 4 is an end view of Fig. 3. Fig. 5 shows a portion of a cylinder in elevation, where the bends are not insulated, with another form of test-flat. Fig. 6 is an end elevation of same. Fig. 7 shows a portion of a cylinder in elevation, where the bends are not insulated, with a divided test-flat.

The card-flats 1 travel over the cylinder 2 upon the parts 3, which are flexible rings supported upon what are termed "cones" 4. These cones are advanced or retracted by means of the screws 5, and as they are moved so are the flexible rings 3, and consequently the card-flats raised or lowered, all as fully described in the specification to the Letters Patent aforesaid.

According to my invention, to ascertain when the teeth of the cards on the flats 1 are touching the teeth of the card-clothing on the cylinder 2, I insulate the flat 1 from the rest of the framing; or, for greater convenience, I insulate at the points 7 the bends 8 themselves, and connect one terminal, 9, of a battery therewith, the other terminal, 10, being connected to some other part of the frame-work of the machine.

Thus when the teeth of the card-flats 1 touch the teeth on the cylinder 2 the circuit is completed, a bell or galvanometer being arranged to indicate such contact. The rings 3 may be then adjusted so as to raise the flats sufficiently clear by means of the screws 5 and cones 4, as described; but in fine setting the cards on the flats may be clear of the cards on the cylinder on one part of the ring 3, and yet, owing to some slight inaccuracy in the radial adjustment of said rings, may touch the cards on the cylinder on another part. To guard against this I select one of the flats, and as it traverses over the ring I try its distance from the cylinder at different points. If it touches and rings the bell at one point and it fails to touch at another point, I lower it by the means before described until it does touch and ring the bell, and so by following the flat through its course over the ring 3 and trying it at different points, and lowering the ring at those points where the flat does not touch and raising them at others, I am enabled to get this flexible bearing-ring 3 to coincide perfectly with the curvature of the cylinder, thus accurately determining the position of the flats in their relation to the cylinder.

In adjusting the position of the cones 4 the screws turn with them the index-dials 6, which are behind the index-finger $6^a$, and when adjusted the dials are all similarly figured, so as to correspond, this being an arrangement patented in Great Britain to one Edmund Tweedale under No. 11,514 of 1885; but in cases where the bends or flats of a machine have not been previously insulated I use a test-flat of special construction to ascertain if the card-flats, when subsequently placed in position, will be accurately adjusted. In the construction shown in Figs. 3 and 4 it consists of a bar, 11, traveling like the ordinary flat over the surface of the rings 3. At about either end it carries insulated blocks 12, through which pass micrometer-screws 13, the heads of which are marked into divisions and numbered, an index-point, 14, being secured to the block. The two blocks are connected by a rod or wire, 15, so that when the one terminal, 9, of a battery is attached to one of them the other will be in connection. These screws 13 are turned down until their ends, which pass through insulated blocks or openings, as indicated in the bar 11, touch the teeth of the cylinder, or the bare cylinder, if unclothed, when the electric bell will ring. This operation having taken place, say, at the point A, (shown in Fig. 4,) and the reading on the marked head of the screw having been noted, the screws are turned back, so as to avoid contact with the card-teeth on the cylinder, and the test-flat is moved forward to the point B. The screw is then set down to its reading at A, when, if contact is not made, the flexible ring 3 is adjusted in the manner before described until it is. The screw is then turned up, the test-flat moved on, and the operation is repeated at the points C D E.

The index-dials 6, which are already subdivided, will now be numbered, like numbers being put opposite the respective index-fingers 6ª, so that when from time to time it is necessary to readjust the flats the dials of the screws 5 will be moved through equal numbers of divisions, and will thus give equal adjustment.

Instead of placing the ends of the test-flat on the rings 3 and causing the micrometer-screws 13 to "feel" for the cylinder-teeth, I may employ the arrangement shown in Figs. 5 and 6, in which case the bar 11 of the flat is bolted to the cylinder at the points 16, while the micrometer-screws 13 travel over the surface of the ring 3. The cylinder 2 is slowly revolved and the screws feel along the rings 3 and ring the bell when in contact, the rings 3 being adjusted by means of the screws 5 when the contact is broken. In this case, if the bends and flat are insulated, as shown in Figs. 1 and 2, the test-flat can lie on the surface of the cylinder without the blocks 12 being insulated; but if the bends and flats are not insulated it is necessary to insulate the test-flat from the cylinder, or, if that is not done, the blocks 12, through which the screws 13 pass, must be insulated, as shown, and connected to one terminal of a battery, as at 9, while the bends are connected to the other, as at 10.

If desired, the test-flat may be divided into two parts, as shown in Fig. 7, in which case each is composed of a short bar, 11ª, bolted to the cylinder 2 at 16ª, carrying screws 13, passing through insulated blocks 12, the points of which screws pass over the rings 3. In this figure each test-flat has a battery, the terminals of which are at 9 and 10, respectively, so that as the cylinder is slowly moved round the bells of each will be ringing when the screws 13 are in contact with the rings 3. As, however, the bends in this figure are not supposed to be insulated, it will be evident that one battery having its terminal 10 on one bend only would suffice if each flat had an indicating-bell which would ring upon the screws, noting any irregularity in the rings 3; but this is only a matter of proper electrical connections, which will be arranged as found convenient in actual working; or one and the same part of the test-flat may be used for both sides of the cylinder, it being only necessary to transfer it from one side to the other, according as it is desired to test and adjust the curvature of the rings 3.

When the circuit is to the teeth of the cards on the cylinder, if the surface of the cylinder has been painted or coated with any substance of an insulating nature, a strip or strips of tin-foil should be laid on same and conducted to the side or inside of same, so as to insure contact. So, likewise, accidental contact by reason of straggling teeth is avoided by coating a part of the frame-work nearest the outer teeth with paint or paint and shellac or other substance by which the side casings may be insulated.

What I claim, and desire to secure by Letters Patent, is—

1. The combination of a card-cylinder and card-flats electrically insulated from each other and connected to form opposite electrical poles, for the purpose set forth.

2. The combination, with a card-cylinder connected to form one pole of an electric battery, of an electric test-flat connected to form the opposite pole, for the purpose set forth.

3. The combination, with a card-cylinder connected to form one pole of a battery, of an electric test-flat consisting of a bar, 11, carrying insulated and connected blocks 12, forming the opposite pole, and indicating-screws 13, adapted to make contact with the cylinder or cylinder card-teeth, substantially as and for the purposes set forth.

4. The combination, with a card-cylinder connected to form one pole of a battery, of an electric test-flat adapted to be secured to said cylinder, carrying insulated and connected blocks forming the opposite pole, and indicating-screws adapted to make contact with the card-flat-bearing rings, substantially as and for the purposes set forth.

5. The combination, with a card-cylinder connected to form one pole of a battery, of an electric test-flat adapted to be secured to said cylinder, carrying an insulated block forming the opposite pole, and an indicating-screw adapted to make contact with either of the card-flat-bearing rings, substantially as and for the purpose set forth.

6. The combination, with a card-cylinder having its bends insulated therefrom and connected to form one pole of an electric battery, of a test-flat connected to form the opposite pole, secured to said cylinder, having an indicating-screw adapted to make contact with the card-flat-bearing ring, substantially as and for the purpose set forth.

In testimony whereof I have hereunto set my hand in the presence of the two subscribing witnesses.

JOHN BULLOUGH.

Witnesses:
E. W. HORNE,
B. GRIMSHAW.